(12) United States Patent
Gogliettino

(10) Patent No.: US 10,739,468 B2
(45) Date of Patent: Aug. 11, 2020

(54) METHOD FOR PREDICTING THE ORBIT OF A SATELLITE AND CORRESPONDING SATELLITE SIGNAL RECEIVER

(71) Applicant: STMICROELECTRONICS S.R.L., Agrate Brianza (IT)

(72) Inventor: Giovanni Gogliettino, Naples (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 483 days.

(21) Appl. No.: 15/221,160

(22) Filed: Jul. 27, 2016

(65) Prior Publication Data

US 2017/0227654 A1 Aug. 10, 2017

(30) Foreign Application Priority Data

Feb. 10, 2016 (IT) .......................... 102016000013755

(51) Int. Cl.
*G01S 19/40* (2010.01)
*G01S 19/27* (2010.01)
*B64G 1/24* (2006.01)

(52) U.S. Cl.
CPC .............. *G01S 19/27* (2013.01); *B64G 1/242* (2013.01)

(58) Field of Classification Search
CPC ........ G01S 19/27; G01S 19/24; G01S 19/243; G01S 19/258; G01S 19/42; G01S 19/40
USPC ............. 342/357.66, 357.63, 357.25, 357.23
See application file for complete search history.

(56) References Cited

U.S. PATENT DOCUMENTS

| | | | | |
|---|---|---|---|---|
| 5,909,381 A | * | 6/1999 | Shome | B64G 1/24 701/531 |
| 5,963,167 A | * | 10/1999 | Lichten | G01S 19/27 342/357.59 |
| 6,133,870 A | * | 10/2000 | Wehner | G01S 5/0072 342/357.36 |
| 8,099,186 B2 | * | 1/2012 | Tekawy | B64G 1/242 244/158.1 |

(Continued)

OTHER PUBLICATIONS

Italian Search Report, dated Sep. 29, 2016, for corresponding Italian Application No. UB20160628, 2 pages.

(Continued)

*Primary Examiner* — Chuong P Nguyen
(74) *Attorney, Agent, or Firm* — Seed IP Law Group LLP

(57) ABSTRACT

A signal receiver method to achieve satellite position fix by improving satellite orbit prediction includes: acquiring satellite signals and navigation data and calculating a position solution, which includes predicting the state or orbit of one or more satellites. The prediction includes using a model of the solar radiation pressure operating on a selected satellite. The method includes: expressing the model of the solar radiation pressure operating on the satellite as a Fourier series having a frequency function of the satellite-Earth-Sun angle and having respective Fourier coefficients, calculating position approximation errors comparing true satellite positions at given time points against predicted satellite positions at corresponding time points, estimating said Fourier coefficients as a function of the position approximation errors, and using the estimated Fourier coefficients in the model of the solar radiation pressure operating on the satellites as a Fourier series used in the model to predict the state or orbit of the satellite.

20 Claims, 2 Drawing Sheets

(56) References Cited

U.S. PATENT DOCUMENTS

| | | | | |
|---|---|---|---|---|
| 8,106,822 | B2* | 1/2012 | Schipper | G01S 19/24 |
| | | | | 342/357.63 |
| 8,125,382 | B2* | 2/2012 | Derbez | G01S 19/05 |
| | | | | 342/357.42 |
| 8,228,230 | B1* | 7/2012 | Capozio | G01S 19/27 |
| | | | | 342/357.66 |
| 8,514,128 | B2* | 8/2013 | McBurney | G01S 19/27 |
| | | | | 342/357.66 |
| 9,057,780 | B2* | 6/2015 | Bar-Sever | G01S 19/13 |
| 9,075,140 | B2* | 7/2015 | Garrison | G01S 19/27 |
| 9,798,015 | B2* | 10/2017 | Gogliettino | G01S 19/27 |
| 2002/0188403 | A1* | 12/2002 | LaMance | G01S 19/05 |
| | | | | 701/469 |
| 2008/0154502 | A1 | 6/2008 | Tekawy et al. | |
| 2008/0177430 | A1* | 7/2008 | Tekawy | B64G 1/242 |
| | | | | 701/13 |
| 2008/0270026 | A1 | 10/2008 | Han | |
| 2010/0060518 | A1 | 3/2010 | Bar-Sever et al. | |
| 2010/0085247 | A1* | 4/2010 | Venkatraman | G01S 19/05 |
| | | | | 342/357.64 |
| 2012/0235861 | A1* | 9/2012 | Venkatraman | G01S 19/05 |
| | | | | 342/357.66 |
| 2014/0316697 | A1 | 10/2014 | Bar-Sever et al. | |
| 2016/0025862 | A1* | 1/2016 | Wengler | G01S 19/05 |
| | | | | 342/357.64 |

OTHER PUBLICATIONS

Bar-Sever et al., "New Empirically Derived Solar Radiation Pressure Model for Global Positioning System Satellites," *IPN Progress Report 42-159*, Nov. 15, 2004, 11 pages.

* cited by examiner

METHOD FOR PREDICTING THE ORBIT OF A SATELLITE AND CORRESPONDING SATELLITE SIGNAL RECEIVER

BACKGROUND

Technical Field

The present description relates to techniques for predicting the orbit of a satellite used by a satellite signal receiver by acquiring satellite signals and navigation data, and calculating a position solution, including predicting the state or orbit of one or more satellites that will be used by a GNSS receiver, said prediction including using a model of the solar radiation pressure operating on said one or more satellite.

Various embodiments may apply e.g., in a GNSS receiver to achieve a faster position fix, in particular for GPS block IIR satellites or IIF block satellites.

Description of the Related Art

Autonomous assisted GNSS (Global Navigation Satellite System) technology works by predicting the state (including position and velocity) of the satellites that will be used by a satellite signal receiver such as a GNSS receiver to achieve the so-called fix, i.e., acquiring satellite signals and navigation data and calculating a position solution, so that it will not be necessary to wait until the broadcast ephemerides are fully downloaded from the sky or from the Internet. To predict the current state of the satellite one or more ephemerides are used, which have been previously, in particular in the recent past, downloaded, either from the sky or from the Internet.

The Time To First Fix (TTFF) performance of GNSS receiver can be improved, allowing it to achieve faster fix either if the receiver is not connected to the Internet at all, or if it is connected but the connection has a high latency or is not available at the moment of the fix.

Therefore, GNSS satellite orbit prediction is very useful to dramatically reduce the Time To First Fix of a GNSS receiver whether it is connected to the Internet or not.

GNSS satellite orbit prediction uses the models of the forces acting on the spacecraft represented by the satellite to predict the future orbit of the spacecraft itself.

The four main forces acting on GNSS satellites are Earth gravity, Sun gravity, Moon gravity and solar radiation pressure.

Among those forces, the solar radiation pressure is the only one that requires a model, which depends upon the spacecraft's type and mass to calculate the acceleration that it produces on the spacecraft itself.

For the above reason it is important to apply a reasonably accurate solar radiation pressure model for each typology of spacecraft. As said, autonomous assisted GNSS prediction requires the knowledge of the spacecraft's type and mass.

The navigation message transmitted by the GNSS satellite (which includes the broadcast ephemeris, from which it is possible to get information on the current state of the satellite—for instance position and velocity) does not contain any information about the satellite type.

Besides, satellites are periodically replaced, and the replacing spacecraft type could be different from the one being replaced. Even if replacement of satellites is a slow process, once it happens it could lead to a worse prediction of the spacecraft orbit and therefore to a deterioration of assisted GNSS performance.

Moreover, satellite mass tends to decrease as time passes, since fuel is spent for orbit correction maneuvers. Even if that is a slow process too, it could lead to a gradual deterioration of assisted GNSS performance.

Known solutions store the satellite type information statically in the receiver device.

Spacecraft replacement could lead to a worse prediction of the satellites orbit (due to the solar pressure model which could not fit the replacing spacecraft) and therefore to a deterioration of autonomous assisted GNSS performance based on that solution.

To avoid assisted GNSS performance deterioration with known solutions the satellite solar radiation pressure model sometimes needs to be updated from the outside (for example with a firmware update of the receiver).

Therefore, if the GNSS receiver is not updated, it could show assisted GNSS performance deterioration.

The subject matter discussed in the Background section is not necessarily prior art and should not be assumed to be prior art merely as a result of its discussion in the Background section. Along these lines, the recognition of one or more problems in the prior art discussed in the Background section and the subject matter associated therewith should not be treated as prior art unless expressly stated to be prior art. Instead, the discussion in the Background section encompassing one or more recognized problems in the prior art should be treated as part of the inventor's approach to the particular problem, which in and of itself may also be inventive.

BRIEF SUMMARY

One or more embodiments provide a method for predicting the orbit of a satellite used by a satellite receiver device which solves the drawbacks of the prior art.

According to one or more embodiments, a method has the characteristics specified in claim 1. One or more embodiments may refer to a corresponding system.

The claims form an integral part of the technical teaching provided herein in relation to the various embodiments.

According to the solution described herein, the method includes expressing the model of the solar radiation pressure operating on the satellite as Fourier series having a frequency function of an angle defined by the solar position with respect to the satellite body fixed frame, in particular of the satellite-Earth-Sun angle and having respective Fourier coefficients, calculating at least position approximation errors comparing true satellite positions at given time points against predicted satellite positions at the same given time points, estimating said Fourier coefficients as a function of at least said position approximation errors, using the estimated Fourier coefficients in the model of the solar radiation pressure operating on the satellites as Fourier series used to predict the state or orbit of the satellite.

In variant embodiments, the method includes that said step of calculating position approximation errors comparing true satellite positions at given time points against predicted satellite positions at the same given time points includes obtaining a verification set of ephemerides at given time instants, obtaining time end points of time intervals around said time instants, obtaining a prediction set of ephemerides and using said prediction set of ephemerides to obtain initial conditions, generating a predicted orbit as a function of said initial conditions, calculating predicted positions of said predicted orbited of the satellite at said time end points, obtaining true positions of the satellite at said time end points from said verification set of ephemerides, comparing said predicted positions and true positions to obtain position approximation errors at said time end points.

In variant embodiments, the method includes truncating the Fourier series of the model of the solar radiation pressure at a given element.

In variant embodiments, the method includes estimating said Fourier coefficients as a function of at least said position approximation errors includes choosing values minimizing said position approximation errors.

In variant embodiments, the method includes that estimating said Fourier coefficients as a function of at least said position approximation errors includes selecting a coefficient among Fourier coefficients setting all other Fourier coefficients CF to fixed values, setting at a given value the selected coefficient, calculating an estimator of the approximation errors, repeating the setting and calculating steps for a given number of times setting another different value for the selected coefficient and calculating the correspondent estimator for each of those values, fitting a sequence of set values and sequence of estimator values for the selected coefficients to find an estimation function, selecting a value associated to the minimum value of the estimation function as an estimated value for the selected coefficient, repeating the preceding steps for each coefficient which is desired to estimate.

In variant embodiments, the method includes that said step of generating a predicted orbit as a function of said initial conditions includes using the approximated second derivative of the position error between the orbit of the satellite and the orbit of the satellite without taking in account the solar radiation pressure, instead of solar radiation pressure.

In variant embodiments, the method includes that the step of calculating at least position approximation errors comparing true satellite positions at given time points against predicted satellite positions at the same given time points includes calculating also velocity approximation errors and acceleration approximation errors.

In various embodiments, the solution described herein is also directed to a GNSS receiver implementing the method in one of the above embodiments.

BRIEF DESCRIPTION OF THE DRAWINGS

Non-limiting and non-exhaustive embodiments are described with reference to the following drawings, wherein like labels refer to like parts throughout the various views unless otherwise specified. One or more embodiments are described hereinafter purely by way of a non-limiting example with reference to the annexed drawings, in which.

DETAILED DESCRIPTION

Figure 1:
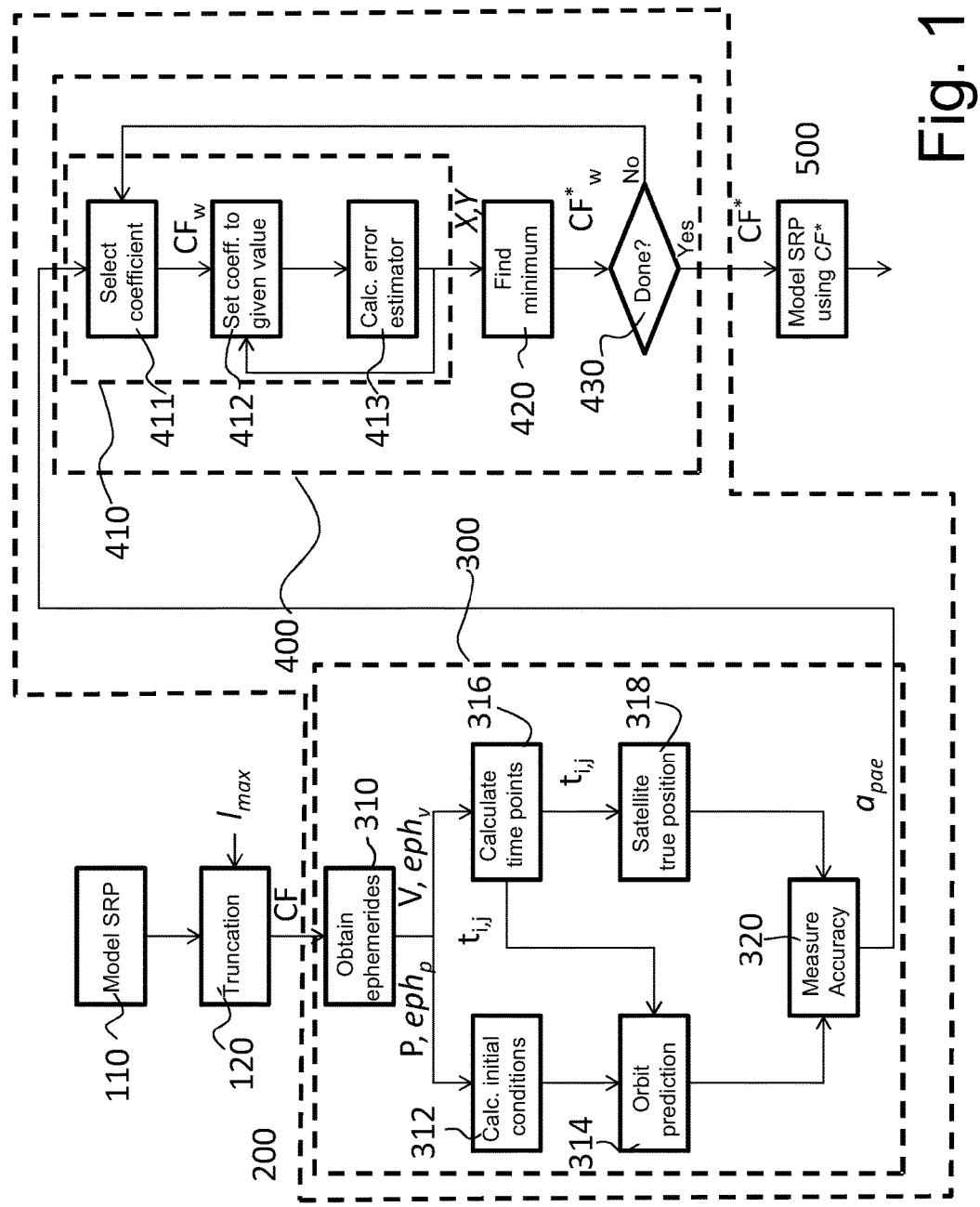
FIG. 1 is a flow diagram showing operations of the method here described.

The ensuing description illustrates various specific details aimed at an in-depth understanding of the embodiments. The embodiments may be implemented without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is meant to indicate that a particular configuration, structure, or characteristic described in relation to the embodiment is comprised in at least one embodiment. Likewise, phrases such as "in an embodiment" or "in one embodiment", that may be present in various points of the present description, do not necessarily refer to the one and the same embodiment. Furthermore, particular conformations, structures, or characteristics can be combined appropriately in one or more embodiments.

The references used herein are intended merely for convenience and hence do not define the sphere of protection or the scope of the embodiments.

Now the method here described will be detailed.

As already mentioned, the four main forces acting on artificial satellites (like GNSS satellites) are Earth gravity, Sun gravity, Moon gravity and solar radiation pressure.

Therefore, the overall acceleration $\ddot{r}(t)$ acting on the satellite can be approximated to the sum $\ddot{r}_a(t)$ of the Earth gravity $\ddot{r}_{Earth}(t)$ the Sun gravity $\ddot{r}_{Sun}(t)$ and Moon gravity $\ddot{r}_{Moon}(t)$ and solar radiation pressure acceleration $\ddot{r}_{SRP}(t)$, because the other forces acting on the satellite are negligible for the purpose of the method here described. Overall acceleration $\ddot{r}(t)$ is therefore.

$$\ddot{r}(t)=\ddot{r}_a(t)=\ddot{r}_{Earth}(t)+\ddot{r}_{Sun}(t)+\ddot{r}_{Moon}(t)+\ddot{r}_{SRP}(t) \quad (1)$$

Satellite position as a function of time t, r(t), i.e., the satellite orbit, can be found by integrating the equation (1) expressing the overall acceleration $\ddot{r}(t)$ of the satellite twice:

$$r(t) \approx r_a(t) = r_0 + v_0 t + \iint_{t_0}^{t}(\ddot{r}_{Earth}(t)+\ddot{r}_{Sun}(t)+\ddot{r}_{Moon}(t)+\ddot{r}_{SRP}(t))dt \quad (2)$$

$r_0$ and $v_0$ being initial conditions on position and velocity. If it is not taken into account the solar radiation pressure $\ddot{r}_{SRP}(t)$ operating on the satellite, it is obtained the following approximation r'(t) for the satellite position:

$$r'(t)=r_0+v_0 t+\iint_{t_0}^{t}(\ddot{r}_{Earth}(t)+\ddot{r}_{Sun}(t)+\ddot{r}_{Moon}(t))dt \quad (3)$$

Hence, from the equation (3) a position error e(t) can be calculated, as difference of the satellite position as a function of time t, r(t), and of approximation of the satellite position r'(t) not taking into account the solar radiation pressure $\ddot{r}_{SRP}(t)$ operating on the satellite, that can be used to approximate the missing solar radiation pressure term:

$$e(t)=r(t)-r'(t) \approx r_a(t)-r'(t)=r_{SRP}(t)=r_{SRP,0}+v_{SRP,0}t+\iint_{t_0}^{t}(\ddot{r}_{SRP}(t))dt \quad (4)$$

Therefore, the second derivative of the position error e(t) can be used as good approximation of the solar radiation pressure term of the position r(t):

$$\ddot{e}(t) \approx \ddot{r}_{SRP}(t) \quad (5)$$

Equations (1) (5) detail the relations between quantities used in the method here described Now, the method for predicting the orbit of a satellite will be described in more detail with reference to the diagram flow of FIG. 1, which depicts possible operations of such method.

Since it is known that solar radiation pressure acceleration $\ddot{r}_{SRP}(t)$ (and therefore the second derivative of the position error $\ddot{e}(t)$) can be approximated to a periodic function of the satellite-Earth-Sun angle $\alpha$ if a short period (e.g., few days) is considered, the method provides a first step 110 of expressing the model of the solar radiation pressure, i.e., the acceleration $\ddot{r}_{SRP}(t)$) operating on the satellite due to the solar radiation as a Fourier series ($\ddot{e}'(t)=[\ddot{e}'_{x_s},\ddot{e}'_{y_s},\ddot{e}'_{z_s}]$) having a frequency function of the satellite-Earth-Sun angle $\alpha$ and having respective Fourier coefficients CF.

It has to be specified that the angle $\alpha$ can be any angle defined by the solar position with respect to the satellite body fixed frame. In particular, it can be the angle between the direction to which the satellite body (excluding the solar arrays) is pointed (i.e., the direction of an arbitrary axis fixed in the satellite body) and the direction to which the satellite solar arrays are pointed (i.e., toward the Sun). In case of antennas which are integral with the body of the satellite, it can be chosen as the angle between the direction to which the antennas point and the direction to which the satellite solar arrays are pointed. Since the face containing the antennas of a GNSS satellite body is always pointed toward the Earth then the satellite-Earth-Sun angle can been chosen in this case. Of course, a different choice may be needed in the case of non-GNSS satellites.

In other words, it can be used a Fourier series $\ddot{e}'(t)=[\ddot{e}'_{x_s}\ \ddot{e}'_{y_s}\ \ddot{e}'_{z_s}]$ to approximate the second derivative of the position error $\ddot{e}(t)=[\ddot{e}_{x_s}\ \ddot{e}_{y_s}\ \ddot{e}_{z_s}]$, as follows:

$$\ddot{e}_{x_s} \cong \ddot{e}'_{x_s} = A_0 + \Sigma_{l=0}^{\infty}(A_{cl}\cos\alpha + A_{sl}\sin\alpha)$$

$$\ddot{e}_{y_s} \cong \ddot{e}'_{y_s} = B_0 + \Sigma_{l=0}^{\infty}(B_{cl}\cos\alpha + B_{sl}\sin\alpha)$$

$$\ddot{e}_{z_s} \cong \ddot{e}'_{z_s} = C_0 + \Sigma_{l=0}^{\infty}(C_{cl}\cos\alpha + C_{sl}\sin\alpha) \quad (6)$$

Equation (6) expresses the components $\ddot{e}_{x_s}$, $\ddot{e}_{y_s}$, $\ddot{e}_{z_s}$ of the second derivative of the position error $\ddot{e}(t)$ along the threes axis $x_s$, axis $y_s$, axis $z_s$. I is the index of the Fourier coefficients, varying between zero and infinite, the set of Fourier coefficients CF includes cosine coefficients $A_{cl}$, $B_{cl}$, $C_{cl}$, and sine coefficients $A_{sl}$, $B_{sl}$, $C_{sl}$ as well as constants $A_0$, $B_0$, $C_0$.

Axis $x_s$ by way of example is oriented along the boresight direction of the solar panels (i.e., is pointed toward the Sun) of the satellite. Axis $y_s$ is parallel to the rotation axis of the satellite's solar panels. Axis $z_s$ is orthogonal to the plane defined by $x_s$, $y_s$ completing the right handed system.

It is also possible to choose a different reference system for axes $x_s$, $y_s$ and $z_s$, where axes $x_s$ and $z_s$ lies on the satellite-Earth-Sun plane and $y_s$ is orthogonal to that plane, for instance.

As indicated in FIG. 1, it is preferable to perform then a step of truncation 120 of the Fourier series expressed by the equations (6), choosing a maximum value $I_{max}$ for the index I of the series.

Then the method here described, after obtaining a set of Fourier coefficient CF of the Fourier series $\ddot{e}_{x_s}$, $\ddot{e}_{y_s}$, $\ddot{e}_{z_s}$, such set CF including Fourier coefficients $A_0$, $A_{cl}$, $A_{sl}$, $B_0$, $B_{cl}$, $B_{sl}$, $C_0$, $C_{cl}$, $C_{sl}$, with I=0 ... $I_{max}$, which value is not yet assigned, includes a procedure 200 to evaluate the values of such Fourier coefficients in the set CF, or part of them, as better detailed in the following, which better fit the pressure radiation model, in particular the second derivative of the error $\ddot{e}(t)$.

To this end the procedure 200 includes first a procedure 300 of calculating position approximation errors $\alpha_{pae}$ comparing true satellite positions at given time points against predicted satellite positions at the same given time points.

Such procedure 300 includes a step 310 of obtaining two sets of the satellite's ephemerides, containing at least one ephemeris each:
  a first set, indicated as prediction set P of ephemerides $eph_p$, is obtained. Such prediction set P is used in following steps 312 and 314 to obtain an orbit prediction $r_e(t)$;
  a second set, indicated as verification set V of ephemerides $eph_v$, is used to obtain true positions and in a step 320 to measure the accuracy of a such predicted orbit.

m indicates the number of ephemerides contained in the prediction set and n the number of ephemerides contained in the verification set. As said m and n are greater than or equal to one.

Ephemerides from both sets, prediction set P and verification set V, have to be enough close in time, i.e., the time of each ephemeris $eph_v$ in the verification set V has to be in the range where the prediction generated from one or more ephemerides $eph_p$ in the prediction set can be considered accurate.

For what regards the prediction set of ephemerides $eph_p$, in a step 312 is used to calculate the initial conditions $r_0$ and $v_0$.

Then in a step 314 it is generated an orbit prediction $r_e(t)$ using the equation (2), in which are used such initial conditions $r_0$ and $v_0$ and the approximated second derivative error $\ddot{e}'(t)$ instead of solar radiation pressure term $\ddot{r}_{SRP}(t)$:

$$r_e(t) = r_0 + v_0 t + \iint_{t_0}^{t}(\ddot{r}_{Earth}(t) + \ddot{r}_{Sun}(t) + \ddot{r}_{Moon}(t) + \ddot{e}'(t))dt \quad (7)$$

As indicated in the following the orbit prediction $r_e(t)$ at step 314 is calculated at specific time points $t_{i,j}$ obtained through the verification set of ephemerides $eph_p$.

Such time points $t_{i,j}$ are calculated from the verification set in a step 316 as follows. Defining a time when the prediction begins (i.e., the initial conditions time) as $t_0$, and $t_1$, $t_2$ ... $t_n$ times of the different verification ephemerides $eph_v$ in the verification set V i.e., verification times $t_i$ (as mentioned n can be 1, thus there is only one verification time $t_1$), for each ephemeris $eph_v$ in the verification set, it can be defined a set of a number p of points in time, $t_{i,1}$ ... $t_{i,p}$, around each verification time $t_i$, which are included in that ephemeris time window ETW. Thus i is the index of the verification times while $t_j$ is the index of the end points around a given verification time $t_i$.

For ephemeris time window ETW, it is meant the period in which the ephemeris is accurate. For instance, for the GPS broadcast ephemeris lasts 4 hours and it is centered on the time $t_i$ of the ephemeris itself.

Figure 2:
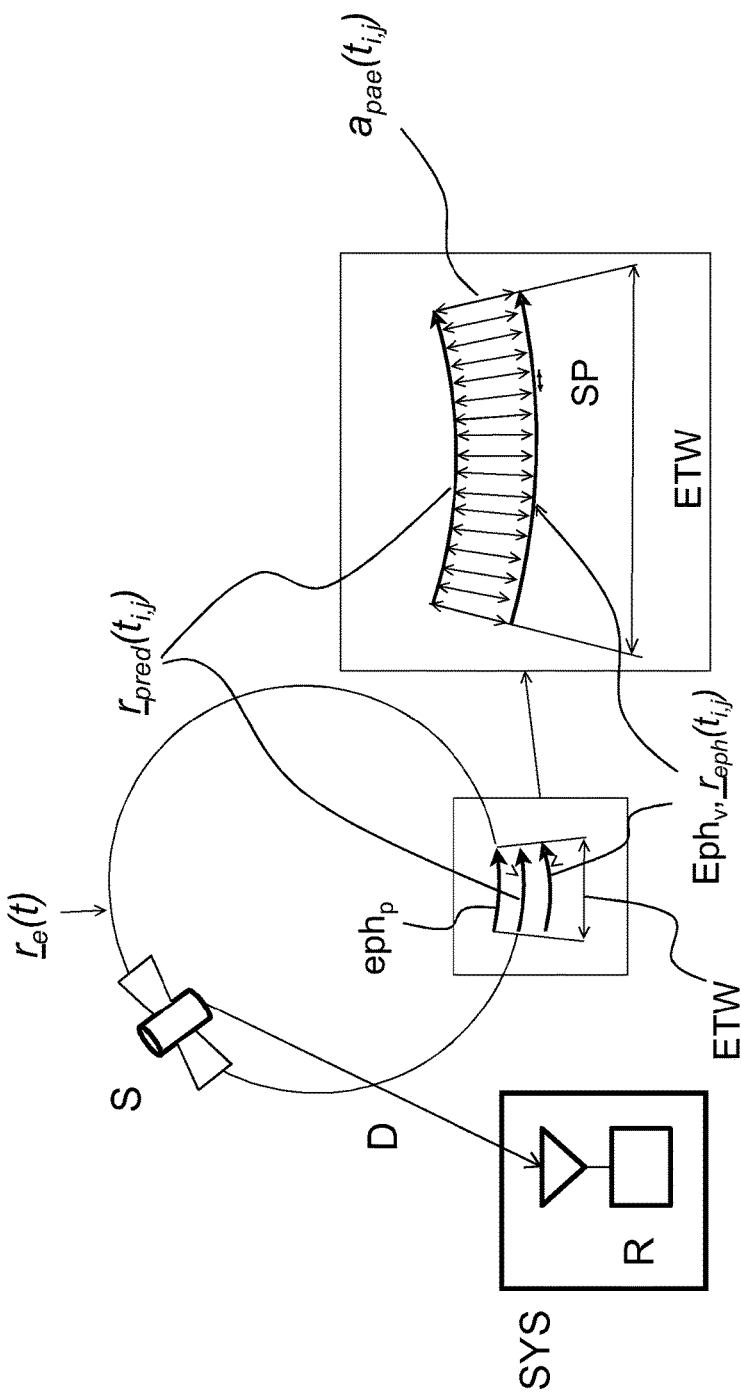
FIG. 2 represents quantities used by the method here described.

Thus the method includes, after obtaining the verification set at step 310, of obtaining said p points in step 316, whose quantities are also in part indicated in FIG. 2. In said step 316, for example, each time window ETW can be divided in equal steps SP, and a time point $t_{i,j}$ can be set for each end point of every time interval defined by the step SP (of course for overlapping ends it is set only one point). As shown in the following in the example with reference to FIG. 2, a window ETW of 4 hours can be divided in steps SP of 15 minutes). As another example, for instance, it is possible to divide a 240-minute GPS broadcast ephemeris window ETW in steps SP of 30 minutes each, so that it is obtained a set of 9 time points $t_{i,j}$:

$t_{i,1} = t_i - 120$ minutes,
$t_{i,2} = t_i - 90$ minutes,
$t_{i,3} = t_i - 60$ minutes,
$t_{i,4} = t_i - 30$ minutes,
$t_{i,5} = t_i$,
$t_{i,6} = t_i + 30$ minutes,
$t_{i,7} = t_i + 60$ minutes,
$t_{i,8} = t_i + 90$ minutes,
$t_{i,9} = t_i + 120$ minutes where $t_i$ is the verification time of that ephemeris $eph_v$.

After step 316, which produces time points $t_{i,j}$, it is possible to calculate in the step 314 the position predictions for each of those time points $t_{i,j}$, indicated as $r_{pred}(t_{i,j})$.

Then it is used a position from the ephemeris $eph_v$ in the verification set to obtain in a step 318 the true position of the satellite's spacecraft at the same time points $t_{i,j}$—indicated as $r_{eph}(t_{i,j})$. In this case positions are not calculated, but directly taken from the verification ephemerides at the given time coordinate, i.e., time point $t_{i,j}$.

Then in a step 320 position approximation errors $a_{pae}(t_{i,j})$ at said time end points $t_{i,j}$ are obtained comparing said predicted positions ($r_{pred}(t_{i,j})$) and true positions ($r_{eph}(t_{i,j})$).

The comparing function of step 320 which produces the position approximation errors $a_{pae}$ can be defined in different ways, for example in one embodiment here described is a difference function:

$$a_{pae}(t_{i,j})=|r_{pred}(t_{i,j})-r_{eph}(t_{i,j})|$$

Therefore, summarizing, after last step 320 of the procedure 300, it is calculated the true satellite positions for all the time points defined as described above, and then they are compared against the positions predicted using the equation (7) for the same points.

The results from such comparison is used in a procedure 400 of estimation of the Fourier coefficients CF of the equation (6): $A_0$, $A_{cl}$, $A_{sl}$, $B_0$, $B_{cl}$, $B_{sl}$, $C_0$, $C_{cl}$, $C_{sl}$.

In other words, coefficients CF of the equation (6) are chosen which minimize the position approximation errors $a_{pae}$.

Alternatively, it is also possible calculate the predicted satellite velocity and acceleration along with the position, use them for the definition of the approximation errors, and then compare them to the corresponding true satellite data from the ephemerides. In this latter case, coefficients CF of the equation (6) are chosen which minimize either the position approximation errors, or the velocity approximation errors, or the acceleration approximation errors, or a combination of them.

To perform the estimation 400, in coefficient selection step 411 a first coefficient among Fourier coefficients CF is chosen, for instance coefficient $A_0$. In the list of coefficients CF, index w going from 0 to a maximum value $w_{max}$ is used for sake of clarity to indicate the Fourier coefficients in order, i.e., $CF=(CF_0, \ldots CF_1 \ldots CF_{wmax})$. In equation (6) with 9 coefficients if $I_{max}=0$ is chosen, then $w_{max}=8$ and $w=0 \ldots 8$, and $CF_0$ corresponds to $A_0$, $CF_1$ to $A_{cl}$ and so on till $CF_8$ which corresponds to $C_{cl}$. The maximum value of the index I of the series, $I_{max}$, can be chosen as any value greater or equal than zero.

Then in a set 412 a value $x_1$ is set for the selected coefficient $CF_w$ and all other Fourier coefficients CF are set to fixed values. Then in a step 413 it is calculated an estimator $y_{est,1}$ of the approximation errors. For instance, it is possible to use the average modulus of the position approximation errors $a_{pae}$ for all the points $(t_{1,1} \ldots t_{n,p})$ of a verification set as estimator $y_{est,1}$ of the approximation errors:

$$y_{est,1} = \frac{\sum_{i=1}^{n}\sum_{j=1}^{p} a_{pae}(t_{i,j})}{p \cdot n}$$

Step 412 and 413 are then repeated for k−1 times, selecting at step 411 another different value ($x_2 \ldots x_k$) for the selected coefficient $CF_w$. k is greater than or equal to three, k≥3. Then it is calculated the correspondent estimator ($y_{est,2} \ldots y_{est,k}$) for each of those values. k is the index of the calculated estimator values for different k value of the selected Fourier coefficient.

The procedure including step 411 and the k times repeated steps 412, 413 is indicated as a whole as procedure 410.

k≥3 different values for the selected coefficient, each one with its own estimator value, are obtained. In other words as output of procedure 410 it is obtained a sequence X of set values $x_1, x_2 \ldots x_k$ for the selected coefficient $CF_w$ under estimation, $X=(x_1, x_2 \ldots x_k)$—and a sequence Y of estimator values $y_{est,1}, y_{est,2} \ldots y_{est,k}$ associated to them, $Y=(y_{est,1}, y_{est,2} \ldots y_{est,k})$.

Then, such sequence X of set values and sequence Y of estimator values are fitted to find (i.e., identify) an estimation function $v_{est}=f(x)$ which express the estimator in function of the coefficient values. For instance, a least squares approach can be used to find a second-order polynomial curve fitting those data.

In step 420 it is found a value $x_{min}$ associated to the minimum value of the estimation function $v_{est}=f(x)$. This value $x_{min}$ corresponds to an estimated value $CF^*_w$ for the selected coefficient $CF_w$.

Block 430 indicates the repetition of the procedure 400 for each coefficient $CF_w$ it is desired to estimate, producing a corresponding estimated coefficient $CF^*_w$ for each selected coefficient $CF_w$.

When repeating the procedure 410 the fixed values to which set in step 412 the other Fourier coefficients of the set CF with index w different from the index of the coefficient selected have to be chosen. For example, for each coefficient, the value could be zero or it could be the estimated value if that coefficient has already undergone the estimation process corresponding to procedure 400.

After all the coefficients CF* have been estimated, in a step 500 such estimated Fourier coefficients CF* are introduced in the model of the solar radiation pressure operating on the satellites as Fourier series used to predict the state or orbit of the satellite, according to equation (6).

Subsequently, the state or orbit r(t) of the satellite is predicted using a model $\ddot{r}_{SRP}(t)$ of the solar radiation pressure operating on said one or more satellite which corresponds to the model obtained at step 500.

Finally, more sets of prediction and verification ephemerides can be used together to improve the accuracy of the coefficients estimation. In this latter case, all the time points are joined and all the approximation errors from all the verification sets are joined before calculating the estimators.

An example of implementation will be given in the following, also with reference to the quantities shown in FIG. 2.

For example, two GPS ephemerides are considered: the first one is put into the prediction set P (i.e., it is used to predict the positions of the spacecraft) and the second one is put into the verification set V (i.e., it is used to verify the prediction in its own four hour time window).

Then, it is needed to choose which coefficients CF of the equation (6) which have to been used.

A non-limiting example of choice is the following one:
- to choose a small maximum value $I_{max}$ for the Fourier index I, for instance 0, to reduce the computational effort,
- to set the Fourier components $f_y$ along axis $y_s$, parallel to the rotation axis of the satellite's solar panels, $f_{y_s}=0$ (i.e., setting all B coefficients to 0 in equation (6)) since the component of the solar pressure orthogonal to the satellite-Earth-Sun plane is negligible due to the satellite's geometry and attitude control.

In that example case, the Fourier series expressing the pressure radiation model in equations (6) can be rewritten as:

$$\ddot{e}_{x_s}=A_0+A_{c0}\cos\alpha+A_{s0}\sin\alpha$$

$$\ddot{e}_{y_s}=0$$

$$\ddot{e}_{z_s}=C_0+C_{c0}\cos\alpha+C_{s0}\sin\alpha \quad (8)$$

Then the coefficients CF of equations (8) are estimated, which in this example are six. It must be noted that since acceleration is equal to the ratio of force to mass, then it is not needed to estimate the satellite mass separately, but the estimated coefficients already take it into account.

A first coefficient $CF_w$ to be estimated is selected in step 411 and the other ones are set to zero. A good choice, as already mentioned, can be the $A_0$ coefficient, since it can be expected that solar radiation pressure will be higher in the axis $x_s$ direction because it is parallel to the Sun-satellite line and perpendicular to the solar panels.

A sequence $X_{A0}$ of values in a predefined interval with a predefined step is selected for the $A_0$ coefficient, and the first value of the sequence is assigned in step 412 to $A_0$.

As shown in FIG. 2, which schematically shows a satellite S, sending satellite signals and navigation data D to a GNSS receiver R, and its orbit predicted $r_e(t)$ from prediction ephemeris (FIG. 2 is not to scale), the predicted positions $r_{pred}(t_{i,j})$ $r_{pred}(t_{i,j})$ are compared against the true positions and true positions $r_{eph}(t_{i,j})$ $r_{eph}(t_{i,j})$ from the verification ephemeris over the predefined points of the time window ETW, which, in this case, has been divided into 15 minute steps SP, and the position errors $a_{pae}(t_{i,j})$ are calculated. Of course, if more verification ephemerides are used, then the comparison procedure described above will be repeated for each verification ephemeris $eph_v$. That will allow the improvement of the accuracy of the Fourier coefficients estimation. FIG. 2 shows a magnification of the time window ETW to better appreciate the steps SP and the position errors $a_{pae}(t_{i,j})$. The GNSS receiver R may be part of a satellite navigation system SYS in some embodiments.

Then the estimator Y of the errors over the verification set window ETW (or windows, if they are more than one) is calculated in step 413 and stored along with the value of the coefficient used to obtain it. In this example, it is chosen the average modulus of the calculated position errors $a_{pae}(t_{i,j})$ of the satellite as estimator.

The above two steps 412, 413 are repeated assigning to the Fourier coefficient $A_0$ each other solar pressure coefficient value of $X_{A0}$ sequence (one at time). As mentioned, sequence $X_{A0}$ has to contain at least three terms (of course, the accuracy of the estimation will increase as the number of terms grows).

At the end of procedure 410, for the $A_0$ coefficient of equation (8) it is obtained a finite sequence of coefficient values $X_{A0}$, and an associated sequence of error estimators $Y_{A0}$.

Now it can be used in step 410 the least squares method to find a second-order polynomial curve fitting to find an estimate sequence $y_{est}=f(x)$ function, which fits the error sequence $Y_{A0}$. The value $x_{min}$ which correspond to the minimum value of that curve (i.e., $\min(y_{est})=f(x_{min})$) is the estimated value for the coefficient.

Once the $A_0$ coefficient has been estimated, it is possible to set such estimated value in equation (8) and estimate all other coefficients of the equation (8) in the same way, one at a time, repeating the procedure 400 under the control of repetition block 430.

For instance, it is possible to continue the coefficients estimation in the following way:

set coefficient $A_0$ to the value that has been previously estimated and estimate coefficient $C_0$ with same procedure, while $A_{c0}$, $A_{s0}$, $C_{c0}$, $C_{s0}$ are set to zero;

set $A_0$ and $C_0$ to the values that have been previously estimated and estimate $A_{c0}$ with the same procedure, while $A_{s0}$, $C_{c0}$, $C_{s0}$ are set to zero;

set $A_0$ and $C_0$ to the values that have been previously estimated and estimate $A_{s0}$ with same procedure, while $A_{s0}$, $C_{c0}$, $C_{s0}$ are set to zero;

set $A_0$, $C_0$, $A_{c0}$ and $A_{s0}$ to the values that have been previously estimated and estimate $C_{c0}$ with same procedure, while $C_{s0}$ is set to zero;

set $A_0$, $C_0$, $A_{c0}$ and $A_{s0}$ to the values that have been previously estimated and estimate $C_{s0}$ with same procedure, while $C_{c0}$ is set to zero.

At the end of these operations, i.e., at the end of procedure 400, all the coefficients $CF=(A_0, A_{c0}, A_{s0}, C_0, C_{c0}, C_{s0})$ of the equations (8) are estimated, i.e., is produced a corresponding estimate CF*.

The following tests have been executed using the solar pressure model detection described in the previous example. Moreover the coefficients of the model have been calculated as described in the very same example.

A first test compares the prediction accuracy of the GPS block IIR satellite solar radiation pressure model proposed by Y. Bar-Sever and D. Kuang in *"New Empirically Derived Solar Radiation Pressure Model for Global Positioning System Satellites" JPL Interplanetary Network Progress Vol.* 24, 159, November 2004 to the accuracy of the method proposed here using a GPS block IIR satellite.

A second test compares the prediction accuracy of the same Bar-Sever and Kuang GPS block IIR satellite solar radiation pressure model to the accuracy of the method proposed here using a GPS block IIF satellite (simulating, in that way, the substitution of an IIR satellite with an IIF one).

In both tests, six different broadcast ephemerides from the same day have been used for verification. Moreover, results from seven different days have been used together to esteem the coefficients of the model.

Then the maximum and average position errors modulus from 12 orbit predictions from both models have been compared.

The prediction method used for all the tests is the same, except for the solar radiation pressure model used, of course.

To highlight the differences due to the adoption of a solar radiation pressure model expressed and calculated as Fourier series, the results are reported as ratio between the maximum and average errors of the proposed model and the maximum and average errors of the Bar-Sever and Kuang model. Therefore, values lower than 100% indicates that the method here disclosed provides lower errors.

The following Table I shows the results for such ratio (second column) corresponding to average and maximum position errors (first column).

The results from the first test are:

TABLE I

| Position error | Ratio |
| --- | --- |
| Average | 93.06% |
| Maximum | 84.84% |

As it can be seen, the proposed model provides a lower value of the average and maximum position errors with respect to the Sever-Kuang model in the case of correct identification of the satellite block. The results from the second test are shown herebelow in Table II:

TABLE II

| Position error | Ratio |
| --- | --- |
| Average | 94.17% |
| Maximum | 77.53% |

As it can be seen, the model detection provide a lower average and maximum errors than Sever Kuang model in the case of wrong identification of the satellite block, e.g., when an IIR block satellite has been substituted with a newer IIF block satellite and the prediction algorithm is not updated for the new satellite block.

The method according to the various embodiments here described presents one or more advantages with respect to previous solutions that are easily applicable in practice, i.e.:

it works with a receiver that is either connected or not connected to the Internet;

it works with a receiver that does not need to operate all the time, i.e., can be switched off for some time; and it needs just a small amount of data to be stored into the receiver.

In particular, the method according to the various embodiments here described needs only to collect periodically two or more ephemerides for each satellite for a certain period. For instance (but not limited to) it can be fed with four ephemerides per day for 7 days.

The method here described is a stand-alone method to detect dynamically the spacecraft type and therefore to avoid the progressive loss of performance in orbit prediction without any external update of the receiver, even in case new types of satellites, with unknown solar pressure models, are put into use.

Of course, without prejudice to the principle of the embodiments, the details of construction and the embodiments may vary widely with respect to what has been described and illustrated herein purely by way of example, without thereby departing from the scope of the present embodiments, as defined the ensuing claims.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
acquiring satellite signals with a satellite signal receiver; and
predicting, by a processor, at least one of a state or an orbit ($\underline{r}(t)$) of a satellite, including using a model ($\underline{\ddot{r}}_{SRP}(t)$) of solar radiation pressure operating on the satellite, the predicting including:
expressing the model of solar radiation pressure ($\underline{\ddot{r}}_{SRP}(t)$) operating on the satellite as a first Fourier series ($\underline{\ddot{e}}c'(t) = [\ddot{e}'_{x_s}\ \ddot{e}'_{y_s}\ \ddot{e}'_{z_s}]$) having a frequency function of an angle defined by a solar position with respect to a body fixed frame of the satellite and having respective first Fourier coefficients of said first Fourier series;
calculating position approximation errors ($a_{pae}(t_{i,j})$) by comparing true satellite positions $\underline{r}_{eph}(t_{i,j})$ corresponding to the satellite signals at given time points against predicted satellite positions ($\underline{r}_{pred}(t_{i,j})$) at corresponding time points;
estimating said first Fourier coefficients of said first Fourier series as a function of said position approximation errors ($a_{pae}(t_{i,j})$); and
using said estimated first Fourier coefficients of said first Fourier series in the model of solar radiation pressure operating on the satellite expressed as a second Fourier series that is used in the model of solar radiation pressure to predict the at least one of the state or the orbit of the satellite; and
determining, by the processor, a position fix of the satellite signal receiver using the predicted at least one state or orbit of the satellite.

2. The method according to claim 1, wherein the satellite signal receiver is a Global Navigation Satellite System (GNSS) receiver.

3. The method according to claim 1, wherein the angle defined by the solar position with respect to the body fixed frame of the satellite is a satellite-Earth-Sun angle ($\alpha$).

4. The method according to claim 1, wherein calculating position approximation errors ($a_{pae}(t_{i,j})$) by comparing true satellite positions $\underline{r}_{eph}(t_{i,j})$ at given time points against predicted satellite positions ($\underline{r}_{pred}(t_{i,j})$) at corresponding time points includes:
obtaining a verification set of ephemerides ($eph_v$) at given time instants;
obtaining time end points of time intervals around said given time instants;
obtaining a prediction set of ephemerides ($eph_p$);
using said prediction set of ephemerides ($eph_p$) to obtain initial conditions;
generating a predicted orbit as a function of said initial conditions ($\underline{r}_0, \underline{v}_0$);
calculating predicted positions ($\underline{r}_{pred}(t_{i,j})$) of said predicted orbit of the satellite at said time end points;
obtaining the true positions ($\underline{r}_{eph}(t_{i,j})$) of the satellite at said time end points from said verification set of ephemerides ($eph_v$); and
comparing said predicted positions ($\underline{r}_{pred}(t_{i,j})$) of said predicted orbit of the satellite at said time end points and true positions ($\underline{r}_{eph}(t_{i,j})$) of the satellite at said time end points to obtain position approximation errors ($a_{pae}(t_{i,j})$) at said time end points.

5. The method according to claim 1, comprising:
truncating, by the processor, the first Fourier series ($\underline{\ddot{e}}(t) = [\ddot{e}'_{x_s}\ \ddot{e}'_{y_s}\ \ddot{e}'_{z_s}]$) of the model of the solar radiation pressure ($\underline{\ddot{r}}_{SRP}(t)$) at a given element ($l_{max}$).

6. The method according to claim 1, wherein estimating said first Fourier coefficients of said first Fourier series as a function of said position approximation errors ($a_{pae}(t_{i,j})$) includes choosing values minimizing said position approximation errors ($a_{pae}(t_{i,j})$).

7. The method according to claim 1, wherein said estimating said first Fourier coefficients of said first Fourier series as a function of said position approximation errors ($a_{pae}(t_{i,j})$) includes:
selecting a coefficient among said first Fourier coefficients of the first Fourier series and setting the coefficient to a first given value;
for a determined number of iterations, setting all other first Fourier coefficients to fixed values and calculating an estimator of the approximation errors;
setting the coefficient to a second given value;

calculating a second estimator of the approximation errors to obtain a respective sequence of set values and a sequence of estimator values;

fitting said sequence of set values and said sequence of estimator values for the coefficients to identify an estimation function ($y_{est}$); and selecting a value associated with the minimum value of the estimation function as an estimated value for the coefficient.

8. The method according to claim 7, comprising:

repeating, by the processor, the estimating of said first Fourier coefficients of said first Fourier series as a function of said position approximation errors a determined number of times.

9. The method according to claim 1, wherein generating the predicted orbit as a function of said initial conditions ($\underline{r}_0$, $\underline{v}_0$) includes:

using an approximated second derivative of a position error ($\underline{\ddot{e}}'(t)$) between the orbit of the satellite that takes the model of solar radiation pressure ($\underline{\ddot{r}}_{SRP}(t)$) into account and the orbit of the satellite that does not take the model of solar radiation pressure ($\underline{\ddot{r}}_{SRP}(t)$) into account.

10. The method according to claim 1, wherein calculating position approximation errors ($a_{pae}(t_{i,j})$) by comparing the true satellite positions $\underline{r}_{eph}(t_{i,j})$ at given time points against the predicted satellite positions ($\underline{r}_{pred}(t_{i,j})$) at corresponding time points includes:

calculating velocity approximation errors; and
calculating acceleration approximation errors.

11. A satellite signal receiver, comprising:
a front-end to acquire satellite signals; and
a processor configured to:
express the model of solar radiation pressure operating on the navigation satellite as a first Fourier series having a frequency function of an angle defined by a solar position with respect to a body fixed frame of the navigation satellite and having respective first Fourier coefficients of said first Fourier series;
calculate position approximation errors by comparing true satellite positions corresponding to the satellite signals at given time points against predicted satellite positions at corresponding time points;
estimate said first Fourier coefficients of said first Fourier series as a function of said position approximation errors;
use said estimated first Fourier coefficients of said first Fourier series in the model of solar radiation pressure operating on the navigation satellite expressed as a second Fourier series that is used in the model of solar radiation pressure to predict a state or an orbit of the navigation satellite; and
determine a position fix of the satellite signal receiver using the predicted at least one state or orbit of the satellite, the predicting of the state or the orbit of the navigation satellite.

12. A satellite signal receiver according to claim 11, wherein the satellite signal receiver is a Global Navigation Satellite System (GNSS) receiver.

13. A satellite signal receiver according to claim 11, wherein the processor is further configured to:

obtain a verification set of ephemerides at given time instants;
obtain time end points of time intervals around said given time instants;
obtain a prediction set of ephemerides;

use said prediction set of ephemerides to obtain initial conditions;
generate a predicted orbit as a function of said initial conditions;
calculate predicted positions of said predicted orbit of the satellite at said time end points;
obtain the true positions of the satellite at said time end points from said verification set of ephemerides; and
compare said predicted positions of said predicted orbit of the satellite at said time end points and true positions of the satellite at said time end points to obtain position approximation errors at said time end points.

14. A satellite signal receiver according to claim 11, wherein the processor is further configured to:

select a coefficient among said first Fourier coefficients of the first Fourier series and setting the coefficient to a first given value;
for a determined number of iterations, set all other first Fourier coefficients to fixed values and calculating an estimator of the approximation errors;
set the coefficient to a second given value;
calculate a second estimator of the approximation errors to obtain a respective sequence of set values and a sequence of estimator values;
fit said sequence of set values and said sequence of estimator values for the coefficients to identify an estimation function ($y_{est}$); and
select a value associated with the minimum value of the estimation function as an estimated value for the coefficient.

15. A satellite signal receiver according to claim 11, wherein the processor is further configured to:

calculate velocity approximation errors; and
calculate acceleration approximation errors.

16. A satellite navigation system, comprising:

a satellite signal receiver coupleable to a plurality of navigation satellites, the satellite signal receiver configured to:
predict a state or an orbit of a satellite of the plurality of navigation satellites; and
calculate a position solution of the satellite signal receiver using the predicted state or orbit of the satellite, predicting the state or the orbit of the satellite causing the satellite signal receiver to:
express the model of solar radiation pressure operating on the satellite as a first Fourier series having a frequency function of an angle defined by a solar position with respect to a body fixed frame of the satellite and having respective first Fourier coefficients of said first Fourier series;
calculate position approximation errors by comparing true satellite positions at given time points against predicted satellite positions at corresponding time points;
estimate said first Fourier coefficients of said first Fourier series as a function of said position approximation errors; and
use said estimated first Fourier coefficients of said first Fourier series in the model of solar radiation pressure operating on the satellite expressed as a second Fourier series that is used in the model of solar radiation pressure to predict the state or the orbit of the satellite.

17. A satellite navigation system according to claim 16, wherein the satellite signal receiver is a Global Navigation Satellite System (GNSS) receiver.

18. A satellite navigation system according to claim 16, wherein predicting the state or the orbit of the satellite further causing the processor to:
 obtain a verification set of ephemerides at given time instants;
 obtain time end points of time intervals around said given time instants;
 obtain a prediction set of ephemerides;
 use said prediction set of ephemerides to obtain initial conditions;
 generate a predicted orbit as a function of said initial conditions;
 calculate predicted positions of said predicted orbit of the satellite at said time end points;
 obtain true positions of the satellite at said time end points from said verification set of ephemerides; and
 compare said predicted positions of said predicted orbit of the satellite at said time end points and true positions of the satellite at said time end points to obtain position approximation errors at said time end points.

19. A satellite navigation system according to claim 16, wherein predicting the state or the orbit of the satellite further causing the processor to:
 select a coefficient among said first Fourier coefficients of the first Fourier series and setting the coefficient at a first given value;
 for a determined number of iterations, set all other first Fourier coefficients to fixed values and calculating an estimator of the approximation errors;
 set the coefficient at a second given value;
 calculate a second estimator of the approximation errors to obtain a respective sequence of set values and a sequence of estimator values;
 fit said sequence of set values and said sequence of estimator values for the coefficients to identify an estimation function ($y_{est}$); and
 select a value associated with the minimum value of the estimation function as an estimated value for the coefficient.

20. A satellite navigation system according to claim 16, wherein predicting the state or the orbit of the satellite further causing the processor to:
 calculate velocity approximation errors; and
 calculate acceleration approximation errors.

* * * * *